March 31, 1925. Re. 16,037

F. O. BERG

SELF STABLE FOLDING TENT

Original Filed Jan. 12, 1924

INVENTOR
Frederick O. Berg
BY
Carl N. Crawford
ATTORNEY

Reissued Mar. 31, 1925. Re. 16,037

UNITED STATES PATENT OFFICE.

FREDERICK O. BERG, OF SPOKANE, WASHINGTON.

SELF STABLE FOLDING TENT.

Original No. 1,502,898, dated July 29, 1924, Serial No. 685,757, filed January 12, 1924. Application for reissue filed August 18, 1924. Serial No. 732,879.

*To all whom it may concern:*

Be it known that I, FREDERICK O. BERG, a citizen of the United States, residing at Spokane, in the county of Spokane and State of Washington, have presented an amended application for reissue of my Patent No. 1,502,898, issued July 29, 1924, for Improvement in Self Stable Folding Tents, of which the following is an amended specification.

My present invention relates to improvements in tents of the umbrella type, and is particularly designed for use by tourists and others as a part of a camp equipment where the ability to fold and pack the tent and its frame into small compass is desirable. The foldable frame and walls of the tent are so combined and arranged as to facilitate the erection of the tent with an interior space from which poles or posts are eliminated thus affording a maximum space for commodious use and accommodations, and a well braced and self sustained structure is provided.

When dismantled, and otherwise, the walls and frame of the tent are retained in connected relation and are capable of being folded and wrapped into a single compact bundle which may then be placed in a storage bag or receptacle for transportation, as upon an automobile.

The invention consists in certain novel combinations and arrangements of parts as will hereinafter be more fully and specifically pointed out and claimed.

In the accompanying drawings I have illustrated one complete example in the physical embodiment of my invention in which the parts are combined and arranged in accordance with the best mode I have thus far devised for practical application of the principles of my invention.

Figure 5:
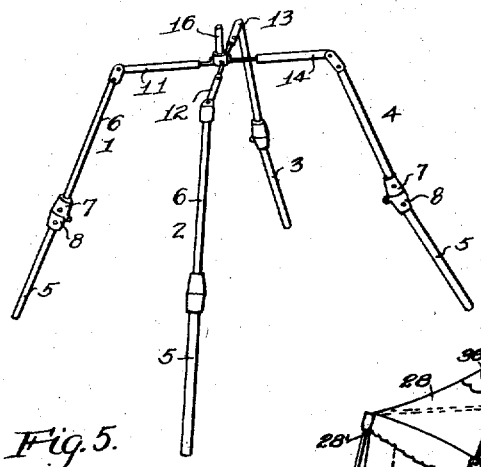
Fig. 5, is an assembly view in perspective of the entire supporting structure for the tent.
Figure 1:
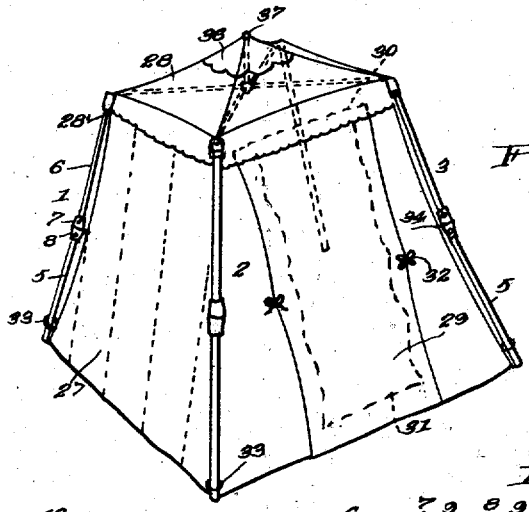
Fig. 1, is a perspective view of a tent embodying the features of my invention and showing the exterior corner posts and in dotted lines illustrating the interior top frame of the tent.
Figure 3:
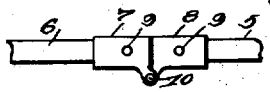
Fig. 3, is a detailed view showing one of the hinge knuckle joints between two sections of one of the exterior corner posts.
Figure 6:
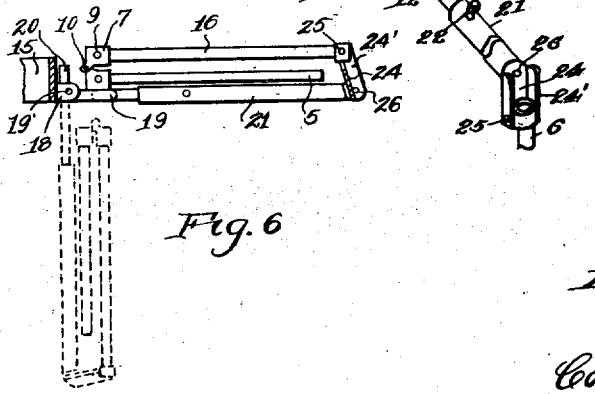
Fig. 6, is a detail view showing one sectional post folded upon a frame bar as for storing and illustrating in dotted lines the method of folding these elements.

The tent is shaped with a rectangular base and top and tapers upwardly, the four exterior posts 1, 2, 3 and 4, being disposed on converging lines when the tent is erected as in Figs. 1 and 5, wherein the frame is illustrated. Each of these four exterior posts is made up of sections, as 5, for the leg portion resting upon the ground, and 6, for the upper section, and the adjoining ends of said post sections are provided with sleeves or joint ends 7 and 8, secured to their respective members by pins 9. These joint ends are provided with an offset hinge joint 10, in order that the adjoining ends of the post sections may squarely abut as in Fig. 3, to form a knuckle joint. Thus when the sections are adjusted toward the tent walls they will dead center lock into a tent supporting position and form continuous posts, as shown in Figs. 1 and 5. When the post sections are adjusted away from the tent walls to fold, the knuckle joint permits the sections to be folded into parallelism, as shown in Fig. 6.

At their upper ends, the corner posts are connected with a substantially horizontally disposed cruciform frame, which as shown, is composed of diagonally arranged, or radiating frame bars 11, 12, 13 and 14, all of which radiate from a pole supporting or key-member which may take the form of a bushing 15, in which a center pole of comparatively short length, as indicated at 16, is adjustably supported as by means of a set screw 17. When the tent is to be erected. this center pole is extended upwardly in the bushing 15, and is secured by set screw 17, to hold the top of the tent taut and slanted. When the parts are to be bundled or wrapped, this pole 16 may be released and slipped downwardly in bushing 15, and then again secured by set screw 17 in a retracted position, thereby reducing the size of the bundle.

Figure 2:
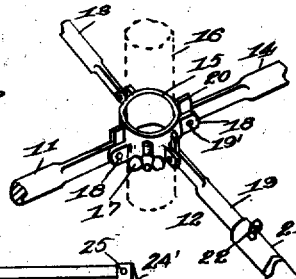
Fig. 2, is an enlarged detail perspective view of a portion of the interior top frame.
Figure 4:
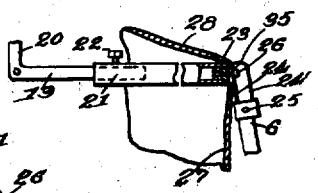
Fig. 4, is a detail view partly in section showing the swivel connection between a corner post and the top frame as well as a pivot joint between the upper section of a post and the swivel bracket.

The bushing 15 forms the key-member for the supporting structure of the tent, and is provided with four pairs of diametrically arranged perforated ears 18, on its exterior surface, in which the four pivot bars 19 are pivoted at 19′. Each of these bars at its inner end is provided with means for supporting bushing 15, which means may take the form of an angular lug 20, which as seen in Fig. 2, engages the central bushing 15 to sustain the tent against collapsing. The pivot bar of each of the top frame bars telescopes within the open end of a pipe section 21, of the top frame, and a set screw 22, is utilized to hold the pipe section or tubular member 21, and the corresponding bar 19, in adjusted relation, as shown in Fig. 4. It will thus be clear that sections 19 and 21 form lengthwise extensible and contractible arms.

At the outer end of each of the tubular sections of the frame bars a plug 23 is secured, to which a swivel bracket 24 is secured. The swivel bracket is carried at the upper end of a post section 6 to which it is pivoted on pin 25, and the bracket is swivelled to plug 23 by a screw 26. The bracket as best seen in Fig. 2, is provided with side plates or flanges 24′ through which pivot pin 25 passes, and it will be clear that these flanges permit the post section 6 to be swung around parallel with section 5, when the tent is to be packed, and they also hold the posts against lateral displacement when the tent is erected. It will be noted that the swivelled axis, or the axis of screw 26, is sufficiently angular to the longitudinal axis of the corresponding post, so that the post cannot turn about its own axis.

It will be seen in Fig. 6, that the joint between the post sections 5 and 6, and the joint between post sections 6 and the top frame bar sections 21, permit the posts and the top frame bars to be compactly folded together and arranged for storing, and the telescopic relation between the pivot bars 19 and tubular sections 21, also permits of a close arrangement of parts for storing. After the four posts have been folded over on the top frame bars and these frame bars compacted as in Fig. 6, these four folded devices are swung on the pivots 19′ to the dotted line position indicated in Fig. 6, the folded devices being then in the same plane as the longitudinal axis of bushing 15, to form a compact bundle.

In erecting the tent, these folded devices are unfolded, the four posts properly positioned and spaced apart and the walls 27 of the tent, assume the shape indicated in Fig. 1. In addition to the four walls 27, the tent is provided with a top 28 and overhanging edges 28′ which extend down over the upper ends of the tent walls as a shield and protection, and a door flap 29, of rectangular shape, is stitched at 30, beneath one of these overhanging portions 28′. The door flap is of sufficient area to cover the door opening 31, shown in dotted lines in Fig. 1, as a cutout in one of the tent walls. The free side edges of the flap 29, may be secured by ties or cords 32 to suitable fastening devices properly located on the exterior of the tent wall.

The four walls of the tent are preferably fashioned and then stitched together to form a single body, which as shown is located with the frame formed by the four exterior posts 1 to 4, and cord loops 33, secured near the lower corners of the tent body, are slipped over the lower ends of the posts, as shown, to support and horizontally distend or spread the tent walls within the structure formed by the posts. Thus all supporting members are eliminated from the space usually occupied within the tent. Additional cords 34, may be used adjacent the knuckle joints to fasten the tent walls thereto and to hold the joints in the dead center locked position shown in Fig. 1. Near the juncture of the side walls with the tent top, the tent structure is provided with grommets through which the screws 26 pass.

It will thus be seen that the frame structure extends through the tent and has a supporting portion inside the tent and a supporting portion outside the tent.

The top frame for supportng the tent top, and which is enclosed thereby, may form a convenient means for hanging garments while dressing.

By inclining the four posts on converging lines, it will be clear that the offset hinges of the knuckle joints, which are located at the inner sides of the four posts, when the tent is erected, not only permit the weight of the load to be borne by the squarely abutting ends of the joints, but this location of the hinge joint eliminates the possibility of the post buckling. The loops and ties that bind the tent body to the posts, hold the body of the tent in properly stretched condition and maintain the walls taut.

The use of the telescopic sectional bars of the top frame, permit of adjustment of the frame to adapt it to all sizes of tents as originally made, and this adjustment may be taken up, if required, to compensate for stretching or shrinkage of the tent from use.

By combining the tent body with the tent frame members, the two elements may be compactly folded together and then bundled into a suitable bag or receptacle for the purpose, and this may be accomplished with facility and without the necessity for skilled or expert attention, thus rendering the apparatus a convenient and desirable outfit or equipment for the performance of its required functions.

A very important feature of my invention consists in making the posts inseparably connected with the radiating arms, the connection involving a pivot, and also pivoting the radiating arms to the key-member or bushing 15, whereby the frame structure will be inseparable from ground to top of the frame. By means of this novel feature, one man can easily set up my improved tent, as it will be clear that when lifting the frame structure from bushing 15, the frame cannot separate under tension. This feature is rendered the more valuable by the novel feature of making the walls and tent top inseparable from the frame.

It will now be clear by reason of the coaction between the tent body and the frame, as a direct result of the mechanical connection of the same, that my improved tent is absolutely self stable when set up and will stand rigidly on a bare floor or cement sidewalk in the entire absence of stakes, guy ropes or other auxiliary means.

While I have shown one specific form of my invention, I do not wish to be limited thereto except for such limitations as the claims may import.

I claim:—

1. In a folding tent, the combination with tent walls, a supporting frame structure for said walls disposed partly outside of said walls, and means holding said walls and structure together when the tent is folded or upright to prevent loss of parts and preserve stability, respectively.

2. In a self stable folding tent, the combination with a top and side walls, a supporting frame therefor comprising upright posts outside said walls, substantially horizontal bars inside of said top, and means extending through the tent and connecting the latter with said posts and bars near the juncture of said walls with said top.

3. In a tent, the combination with a top and side walls, a supporting frame including substantially horizontal bars inside of said top and upright posts outside of said side walls, and swivelled means extending through said tent and connecting the latter with said frame and connecting said posts with said bars.

4. In combination, a self stable folding tent, and a supporting frame extending through said tent and having a supporting portion inside of and a supporting portion outside of and connected with lower portions of said tent to retain the latter in a fully spread condition.

5. In a tent structure, a frame comprising a central member, bars pivoted to and radiating from said central member, posts in permanent pivotal connection with the outer ends of said bars thereby providing a frame in permanent connection from top to ground, and a tent in permanent connection with said frame.

6. A folding tent frame including upright post sections, and means hinging said sections end to end to break joint when adjusted away from the walls of a tent and dead center lock when adjusted towards the walls of a tent.

7. A folding tent including side walls, upright tent supporting posts outside of said walls, each post having an offset knuckle hinge constructed to break joint when adjusted away from said side walls to fold and dead center lock when adjusted toward said side walls to support the latter.

8. In a tent, the combination with foldable posts and a top frame comprising a central key-member and radiating bars pivoted thereto, of a bracket between each post and its complementary radiating bar, said bracket having a pivotal connection to one member and a permanent swivelled connection with the other member.

9. A self stable folding tent comprising a top and side walls, a supporting frame structure having a tent top supporting portion inside of the top of said tent and supporting posts disposed outside of and adjacent the corners of said tent walls, and means connecting the corner portions of said tent walls with said posts to hold the tent walls distended.

10. In a self stable folding tent, a tent top and side walls, supporting posts outside of and at the corners of said walls and said posts being hingedly connected in end to end relation to break joint when adjusted away from the tent walls and dead center lock when adjusted toward the tent walls, whereby the weight of the tent will act to hold said posts in a dead center locked position.

In testimony that I claim the foregoing as my own, I hereby affix my signature.

FREDERICK O. BERG.